United States Patent Office 3,053,800
Patented Sept. 11, 1962

3,053,800
BLENDS OF (1) POLYVINYLCHLORIDE, (2) A COPOLYMER OF POLYBUTADIENE, STYRENE AND ACRYLONITRILE AND (3) A COPOLYMER OF ACRYLONITRILE, STYRENE AND ALPHA METHYL STYRENE
Thomas S. Grabowski, Vienna, and Howard H. Irvin, Parkersburg, W. Va., assignors to Borg-Warner Corporation, Chicago, Ill., a corporation of Illinois
No Drawing. Filed May 4, 1959, Ser. No. 810,528
8 Claims. (Cl. 260—45.5)

This invention relates to polyvinyl chloride blends exhibiting new and unexpected properties. In one specific aspect thereof, this invention relates to high impact polyvinyl chloride blends of high heat distortion temperature. In another aspect thereof, this invention relates to high impact polyvinyl chloride blends of high heat distortion temperature and high tensile strength. In an even more specific aspect thereof, this invention relates to high impact polyvinyl chloride blends of high heat distortion temperature, high tensile strength and high hardness.

Polyvinyl chloride resins are generally resistant to abrasion and are chemically inert, exhibiting excellent resistance to most salts, acids, alkalies, alcohols, aliphatic hydrocarbons, et cetera, and good resistance to degradation by oxygen, ozone and ultra violet light. Also, these materials exhibit good flame resistance being self extinguishing if ignited. Because of these outstanding properties, recently increasing amounts of polyvinyl chloride resins in unplasticized or but slightly plasticized form have been used in the production of various structural shapes such as rigid sheets and moldings, pipes, valves, fittings, and similar objects.

However, unplasticized or but slightly placticized polyvinyl chloride resins have low impact values and this seriously limits the production and utilization of rigid shaped articles made from such materials. Thus, in the production of rigid shaped articles from such materials, sharp directional transitions must be avoided and threading of such articles is not recommended. In the utilization of such rigid shaped articles care must be exercised to avoid force fitting and overstressed conditions during assembly (for example, of pipe and required fittings and valves) and the final assembly must not be subjected to vibration, shock, or impact loads during use.

Attempts have been made to overcome the deficient impact strength of polyvinyl chloride resins by blending certain materials therewith. While blends exhibiting higher impact values than the straight polyvinyl chloride resin component may be produced by such blending procedures, the improvement in this physical characteristic is accompanied by a sacrifice in one or more of the desirable characteristics of the polyvinyl chloride resin component. Thus, a blend of polyvinyl chloride with the amount of elastomeric modifier required to give a blend of high impact value shows a lower tensile strength, a lower heat distortion temperature and a lower surface hardness than the straight polyvinyl chloride used in preparing the blend. As a result, the production and permissible uses of rigid shaped articles made from such blends is still seriously circumscribed.

We have found that three component blends of (a) polyvinyl chloride, (b) a graft copolymer of the nature described specifically and in detail subsequently, and (c) a copolymer or terpolymer of the nature described specifically and in detail subsequently not only exhibit a high impact value but also are characterized by a high heat distortion temperature, a high tensile strength and a high hardness.

One object of this invention is to provide high impact polyvinyl chloride blends characterized by a high tensile strength.

A further object of this invention is to provide high impact polyvinyl chloride blends characterized by a high hardness.

Another object of this invention is to provide high impact polyvinyl chloride blends characterized by a high heat distortion temperature.

An additional object of this invention is to provide high impact polyvinyl chloride blends characterized by a high heat distortion temperature and a high tensile strength.

Yet another object of this invention is to provide high impact polyvinyl chloride blends characterized by a high heat distortion temperature and a high hardness.

A still further object of this invention is to provide high impact polyvinyl chloride blends characterized by a high tensile strength and a high hardness.

An additional object of this invention is to provide high impact polyvinyl chloride blends characterized by a high heat distortion temperature, a high tensile strength and a high hardness.

Other objects of this invention will become apparent as the description thereof proceeds.

Graft copolymers suitable for use as one component employed in the formation of the high impact polyvinyl chloride blends of this invention may be prepared by the interaction, under polymerizing conditions, of a mixture of vinyl cyanide or a asym. cyano, alkyl substituted ethylene compound and a vinyl aromatic hydrocarbon or an asym. alkyl, aryl substituted ethylene, exemplified by a mixture of acrylonitrile and styrene, with a conjugated diolefine polymer latex, exemplified by polybutadiene latex. The organic portion of the reaction mixture comprises from about 40% to about 80% by weight combined acrylonitrile plus styrene and, correspondingly, 60 to 20% by weight (dry basis) polybutadiene. The acrylonitrile preferably comprises from about 10% to about 30% by weight of the three component organic mixture (acrylonitrile plus styrene plus polybutadiene), the styrene from about 30% to about 70% by weight and the polybutadiene from about 20% to about 60% by weight of the three component mixture.

For the better understanding of this invention, the following example sets forth a description of the preparation and a listing of physical properties of representative graft copolymers suitable for use as a component in forming the new and improved high impact polyvinyl chloride blends of this invention. It will be noted that with respect to the nature of the organic reactants employed, the recipes of the following example are identical although there are some differences in the proportions in which these organic reactants are employed. Thus, the sum of acrylonitrile plus styrene is 80% by weight (of acrylonitrile plus styrene plus polybutadiene) in the recipe for graft copolymer X but only 70% by weight in the recipes for graft copolymers Y and Z. However, it will be noted that the styrene/acrylonitrile ratio is approximately the same (about 1.8/1 by weight) in all three recipes. Also, it will be observed that some differences are to be found in the amounts of certain auxiliary components employed in the respective polymerization recipes. As would be expected, the respective graft copolymers produced are more or less similar in physical properties although there are some differences as the subsequent discussion will show. Any one of these graft copolymers may be employed interchangeably as a component of the new and improved high impact polyvinyl chloride blends of this invention or, if desired, blends of two or more of these graft copolymers may be employed as a component of the new and improved high impact polyvinyl chloride blends of this invention.

Example 1

The following polymerization recipes (given in parts by weight) were employed:

| Graft copolymer designation | X | Y | Z |
| --- | --- | --- | --- |
| Polybutadiene equivalent of the polybutadiene latex | 20.0 | 30.0 | 30.0 |
| Acrylonitrile | 29.0 | 25.0 | 25.0 |
| Styrene | 51.0 | 45.0 | 45.0 |
| Cumene hydroperoxide | 0.75 | 0.75 | 0.56 |
| Sodium salt of hydrogenated disproportionated rosin | 2.0 | 2.0 | 1.9 |
| Sodium pyrophosphate | 0.5 | 0.5 | 0.15 |
| Sodium hydroxide | 0.15 | 0.15 | 0.15 |
| Sodium salt of condensed alkyl naphthalene sulfonic acid | 0.15 | 0.15 | 0.0 |
| Dextrose | 1.0 | 1.0 | 1.0 |
| Ferrous sulfate | 0.01 | 0.01 | 0.004 |
| Water, including water in the polybutadiene latex | 160.0 | 160.0 | 216.0 |

The above recipes were separately introduced into individual glass reactors which were sealed and tumbled for six hours in water baths heated to temperatures within the approximate range 45–80° C. At the end of this time reaction was essentially complete. The polymeric products formed were recovered as follows: The final reaction mixtures were separately coagulated with dilute brine and dilute sulfuric acid, heated to 95° C. to produce partial granulation of the coagulated products (to facilitate subsequent filtration and washing operations), filtered, washed and finally dried to constant weight at 110° C.

Portions of the dried graft copolymers were individually worked on a heated mill and the sheets produced were separately molded at an elevated temperature to produce test strips suitable for use in the determination of certain physical properties of the products. These physical properties are tabulated below:

| Graft copolymer designation | X | Y | Z |
| --- | --- | --- | --- |
| Notched Izod Impact Value, ⅛ in. bar, (A.S.T.M. Method D-256), Ft.Lbs./Inch of Notch, 22.8° C | 3.5 | 5.5 | 9.0 |
| Rockwell Hardness, R Scale (A.S.T.M. Method D-785) | 100 | 87 | 83 |
| Tensile Strength, Lbs./Sq. In. (A.S.T.M. Method D-638) | 5,645 | 4,500 | 4,000 |
| Elongation at Break, Percent (A.S.T.M. Method D-638) | 20 | 30 | 75 |
| Melt Index, A1 (Note A) | 2.2 | 1.5 | |
| Melt Index, A3 (Note A) | | | Below 0.1 |
| Heat Distortion Temperature, ° C. (Note B) | 98.0 | 98.0 | |

NOTE A.—A modification of the procedure set forth in A.S.T.M. method D-1238–52T. This procedure was originally developed for determining the melt index of polyethylene. Broadly and briefly, in this method, the weight in grams of polyethylene that is discharged during a period of three minutes through a standard orifice positioned below a reservoir of the polymer that is at a standard temperature and under a standard pressure is determined. This determination is proportioned to give the grams of polymer discharged during ten minutes which figure is, by definition, the melt index of polyethylene.

Since the thermoplasticity of materials with which this invention is concerned is not even of the same order of magnitude as that of polyethylene, a considerable modification of the standard conditions and dimensions set forth in A.S.T.M. method D-1238 had to be made in order to make this general method applicable to be blends with which this invention is concerned. These modifications involved changes in the size of the orifice, the pressure applied to the blend in the reservoir, the reservoir temperature, and the like.

As used herein, melt indices designated A1 express the weight in grams of polymer or polymer blend discharged in one minute through an orifice 0.125 inch in diameter and 0.315 inch long from a reservoir 0.373 inch in diameter containing polymer or polymer blend maintained at a temperature of 410° F. and under a pressure produced by a 5664 g. load. Thus an A1 melt index of 1.5 means that 1.5 g. of polymer or polymer blend were discharged through the orifice in one minute under the conditions named. A3 melt indices are similarly determined but with these the discharge time is three minutes.

NOTE B.—A compression molded bar one inch wide, four inches long and 0.041 to 0.045 inch thick is employed as the test specimen in determination of heat distortion temperature. The test bar is carefully centered upon and forms a bridge between two supports, the knife edges of these supports being separated by a distance of exactly 3.75 inches. It is seen that the molded test bar extends beyond each of the supports for a distance of 0.0125 inch. A 30 g. weight is placed on the exact center of the so supported test bar. The resulting assembly is located in an air oven and heat (electrically generated) is applied at the rate necessary to secure a temperature rise of the air of 1° C. per minute. The temperature at which the bar falls from the supports is the heat distortion temperature of the blend.

As has been indicated previously, a number of variations are possible with respect to the nature of the reactants and auxiliary agents of the recipes, the proportions thereof, and the reaction conditions employed in the preparation of graft copolymer blending components of the compositions of this invention.

Thus, and referring to the specific recipes of Example 1, it will be noted that the concentrations of catalyst, of sodium pyrophosphate and of ferrous sulfate in the graft copolymer Z recipe are all appreciably lower than the corresponding values of the graft copolymer X and Y recipes while the Z recipe is completely devoid of the alkyl naphthalene sulfonic acid sodium salt surface tension reducing agent to be found in the X and Y recipes. As a result of these changes, and as has already been shown, graft copolymer Z exhibits a higher average molecular weight, higher impact strength and a lower melt index than graft copolymers X and Y. The differences in physical properties between the graft copolymers are magnified if graft copolymer Z is prepared at a polymerization temperature in the lower portion of the range previously given while graft copolymers X and Y are made using a polymerization temperature in the upper portion of this range.

Furthermore, the polybutadiene latex may be replaced, in part or entirely, by other conjugated diolefine polymer latices. In the preparation of such other latices the butadiene component may be replaced, in part or entirely, by such conjugated diolefines as isoprene, pentadiene-1,3, the methyl 1,3-pentadienes, dimethyl butadiene-1,3, the 1,3- and 2,4-hexadienes, and the like, including mixtures of two or more such conjugated diolefines (including butadiene-1,3).

Likewise, in the preparation of the graft copolymer blending component of this invention, the styrene may be replaced, in part or entirely, by such other vinyl aromatic hydrocarbons as the vinyl toluenes and asym. alkyl, aryl substituted ethylene such as alpha methyl styrene, alpha methyl vinyl toluenes, and the like, including mixtures of two or more such hydrocarbons (including styrene).

Also, if desired, in the preparation of the graft copolymer blending component of the compositions of this invention the acrylonitrile may be replaced, in part or entirely, with other vinyl cyanide type compounds such as methacrylonitrile, ethacrylonitrile, and the like, including mixtures of two or more such compounds (including acrylonitrile).

The other synthetic polymer employed in the production of the polyvinyl chloride blends of this invention is prepared by the copolymerization of a minor proportion of vinyl cyanide or a vinyl cyanide type compound and a major proportion of an asym. alkyl, aryl substituted ethylene or, preferably, a major portion of a mixture of a vinyl aromatic hydrocarbon and an asym. alkyl, aryl substituted ethylene. Particularly suitable synthetic polymer blending components of this nature are obtained if the greater part of the total monomer mixture comprises a relatively large quantity of alpha methyl styrene together with a small quantity of styrene and the lesser part of the total monomer mixture comprises acrylonitrile. The acrylonitrile preferably comprises from about 20% to about 30% by weight of the total monomer mixture employed in forming the blending resin. The vinyl aromatic hydrocarbon and/or asym. alkyl, aryl substituted ethylene comprise, correspondingly, from 80% to 70% by weight of the reaction mixture and, as mentioned previously, may consist of alpha methyl styrene exclusively or advantageously may be a mixture of alpha methyl styrene and styrene in a ratio of from about 50:50 to say 90:10 or higher.

To facilitate the understanding of this invention the following specific embodiments covering the preparation of synthetic polymers of this second type are given below but it is to be understood that the embodiments and details set forth are illustrative only and the spirit and scope of the invention is in no way limited to such specific embodiments and details thereof.

*Example 2*

Copolymers of alpha methyl styrene and acrylonitrile and terpolymers of alpha methyl styrene, styrene and acrylonitrile, suitable for use as one of the synthetic polymer components of the polyvinyl chloride blends of the present invention may be prepared in accordance with the following recipes (set forth in parts by weight) and operating procedures.

While the ratios of alpha methyl styrene, styrene and acrylonitrile differ in the various recipes, the remaining components thereof are the same in all recipes both with respect to identity and amount. Accordingly, information on these remaining components is presented but once in the following table. Also, as a matter of interest, the table gives the heat distortion temperatures of the various polymers formed.

| Polymer resin designation | A | B | C | D | E | F |
|---|---|---|---|---|---|---|
| Alpha methyl styrene | 70 | 62.5 | 60 | 50 | 50 | 40 |
| Styrene | 0 | 7.5 | 10 | 20 | 30 | 40 |
| Acrylonitrile | 30 | 30 | 30 | 30 | 20 | 20 |
| Heat Distortion Temperature, °C. (Note B) | 109 | ------ | 118.5 | 100 | 97.5 | 92.5 |
| Potassium persulfate* | | | 0.25 | | | |
| Sodium hydroxide | | | 0.1 | | | |
| Sodium salt of hydrogenated disproportionated rosin | | | 2.0 | | | |
| Water | | | 200.0 | | | |

* See further remarks under the following description of the operating procedure.
NOTE B.—See correspondingly designated note of the table of physical properties, Example 1.

The preparative procedure followed in the production of terpolymer resin B will be described as exemplifying the procedure followed in the preparation of all copolymer and terpolymer resin blending components of this example.

The organic reactants (alpha methyl styrene, styrene and acrylonitrile) were emulsified in the water which contained the small amount of sodium hydroxide and the rosin soap type emulsifier. The potassium persulfate catalyst was then added, the reaction vessel was sealed and entered into a water bath heated to 80°–85° C. The reaction vessel was tumbled in the water bath at the temperature given until the reaction was about 90% complete at which time the vessel was removed from the water bath, opened, and an additional 0.125 part by weight potassium persulfate catalyst were added. The reaction vessel was resealed and reentered into the water bath (heated to the temperature previously given) and tumbling of the reactor therein was continued until the polymerization reaction was essentially complete. In the preparation of the terpolymer resins of this example, the total reaction time was five hours. In the preparation of terpolymer resin B the yield of terpolymer was 98.0% of theory.

The latex produced is coagulated by treatment with a solution of an electrolyte such as dilute brine, dilute alum solution, or dilute sulfuric acid, or mixtures thereof. The resulting coagulated mixture is preferably heated to about 95° C. to bring about partial granulation of the coagulum, thus facilitating subsequent filtering and washing operations. The coagulum is separated by filtration, is washed with water and then dried to constant weight at 110° C.

It will be noted that with a single exception (resin A) all recipes of this example include more or less styrene in addition to alpha methyl styrene. In contrast to styrene, the emulsion polymerization of alpha methyl styrene proceeds at a very slow rate. However, the presence of even a small amount of styrene greatly accelerates the rate of emulsion polymerization of alpha methyl styrene. Accordingly, it is advantageous to employ a styrene-alpha methyl styrene mixture in order to accelerate the emulsion polymerization reaction. However, and confining attention to the binary styrene-alpha methyl styrene mixture, preferably this contains not more than about 7% to 15% styrene. If a larger amount of styrene is present, the rate of emulsion polymerization is not greater than observed when 7% to 15% styrene is present but, as may be seen from the data of the table of this example, the heat distortion temperature of the resulting terpolymers decreases as the proportion of styrene in the recipe increases. Accordingly, the maximum polymerization rate and the maximum heat distortion temperature is obtained when styrene represents not more than about 7% to 15% of the styrene-alpha methyl styrene mixture, corresponding to not more than about 5% to 10% of the styrene-alpha methyl styrene-acrylonitrile mixture.

To facilitate exposition, in what follows both the alpha methyl styrene-acrylonitrile copolymer and the styrene-alpha methyl styrene-acrylonitrile terpolymer are usually referred to by the broad, inclusive term "copolymer."

As has been indicated previously, some variations are possible with respect to the nature of the reactants, the proportions thereof and the reaction conditions employed in the preparation of the copolymers of Example 2, employed as one component in the production of the polyvinyl chloride blends of this invention.

Thus, alpha methyl styrene may be replaced, in part or entirely, by other asym. alkyl, aryl substituted ethylene such as alpha ethyl styrene, the alpha methyl vinyl toluenes, and the like, including mixtures of two or more such compounds (including alpha methyl styrene).

Likewise the styrene may be replaced, in part or entirely, by other vinyl aromatic hydrocarbons such as the vinyl toluenes including mixtures of two or more such hydrocarbons (including styrene).

Also, if desired, in the preparation of the blending components of this example the acrylonitrile may be replaced, in part or entirely, with other vinyl cyanide type compounds such as methacrylonitrile, ethacrylonitrile, and the like, including mixtures of two or more such compounds (including acrylonitrile).

The three component blends of this invention may be prepared by admixing (a) polyvinyl chloride, (b) a graft copolymer of the nature set forth in Example 1 hereof and (c) a copolymer of the nature set forth in Example 2 hereof by known methods and means, for example, by milling the components of the blend in suitable proportions on a roll mill with heated rolls until a uniform blend is produced which is then sheeted off the mill for use as desired. However, blending components (b) and (c) are both produced in the form of individual polymer latices and an extremely uniform blend of these two materials is readily prepared by mixing appropriate volumes of the two latices and then coagulating the mixture and separating, washing and drying the resulting coagulum by conventional methods such as have been briefly described herein. A suitable quantity of this resulting blend of the graft copolymer and the copolymer is then admixed with the proper amount of polyvinyl chloride (for example, on a roll mill) to produce a three component blend of this invention. Obviously, if the polyvinyl chloride is also available in the form of a latex then extremely uniform three component blends of this invention may be prepared by mixing appropriate volumes of the polyvinyl chloride latex, of the graft polymer latex and of the copolymer latex and then coagulating the resulting mixture and separating, washing and drying the resulting coagulum by conventional methods.

The three component blends of this invention preferably contain a predominant proportion of polyvinyl chloride and minor proportions of the graft copolymer blending component and of the copolymer blending component. Thus, the polyvinyl chloride may comprise from about 45% by weight to about 82% by weight of the three component blends of this invention while the graft copolymer blending component plus the copolymer together represent, correspondingly, from 55% by weight to 18% by weight of the blends of this invention. Confining attention to the graft copolymer blending component and the copolymer blending component, preferably the graft copolymer comprises from about 50% to about 60% by weight and the copolymer represents, correspondingly, from 50% by weight to 40% by weight of the total weight of these two blending components. The graft copolymer, component (B), comprises 10% to 30% of the total weight of the three components of the invention and preferably 15% to 20% of the total weight. The copolymer, component (C), comprises from about 8% to 25% of the total weight of the three components of the invention and preferably 10% to 20% of the total weight.

The vinyl chloride component of the blends of this invention may be a vinyl chloride homopolymer or a copolymer produced by the polymerization of a mixture of a major proportion (80%–85% or more) vinyl chloride and a minor proportion (15%–20% or less) of one or more other monomers copolymerizable with vinyl chloride. A wide variety of monomers and monomer mixtures may be copolymerized with vinyl chloride to produce such copolymers but vinyl acetate, vinyl stearate, vinylidene chloride, acrylic acid esters or mixtures of two or more of these materials are most commonly used for the purpose.

For the better understanding of this invention the following specific illustrative but non-limiting examples of three component blends prepared in accordance with the teachings thereof are given.

*Example 3*

A conventional general purpose polyvinyl chloride of low impact value was employed as a component in the preparation of the blends shown in the table below. This polyvinyl chloride had a notched Izod impact value at 23° C. of 1.8 pounds per inch of notch, a Rockwell hardness (R scale) of 116 and a specific viscosity of 0.42 (A.S.T.M. method D–1243–54).

| Composition No. | 1 | 2 | 3 |
| --- | --- | --- | --- |
| Parts by weight: | | | |
| Polyvinyl chloride | 60 | 66.7 | 66.7 |
| Blending component Y, Example 1 | 20 | | |
| Blending component Z, Example 1 | | 16.6 | 19.6 |
| Blending component B, Example 2 | 20 | 16.6 | 13.7 |
| Dibutyl tin mercaptide (Note C) | 2 | 2.0 | 2.0 |
| Mineral oil (processing aid) | 1 | 1.0 | 1.0 |
| Properties of compositions: | | | |
| Izod Impact Value at 23° C., Ft.lb./in. notch., ⅛ inch specimen, A.S.T.M. D–256 | 12.3 | 3.5 | 17.2 |
| Rockwell Hardness, R Scale, A.S.T.M. D–785 | | 115 | 111 |
| Heat Distortion Temperature, ° C. (Note B) | 87 | 81 | 82 |
| Tensile Strength, Lbs./Sq. in., A.S.T.M. D–638 | 7,050 | 7,000 | 6,880 |
| Elongation at Break, Percent, ¼ inch specimen, A.S.T.M. D–638 | 80 | 140 | 70 |
| A 3 Melt Index (Note A) | 0.5 | | |

NOTES A and B.—See correspondingly designated notes following table of physical properties of Example 1.

NOTE C.—This material was employed to improve the processing and environmental stability of the polyvinyl chloride component. The dibutyl tin mercaptide may be replaced, in part or entirely, by one or a combination of the many other known stabilizers conventionally employed in polyvinyl chloride systems or, if desired, use of stabilizers may be omitted entirely with some sacrifice in the processing and environmental stability of the polyvinyl chloride component.

As may be seen by consulting Commercial Standard CS201–55 (United States Department of Commerce) covering rigid polyvinyl chloride sheets, the transition from Type I (normal impact) polyvinyl chloride to Type II (high impact) material is accompanied by a pronounced deterioration in many other physical properties. Thus the specifications for Type II (high impact) materials call for an appreciably lower tensile strength, hardness, etc., than required of Type I (normal impact) polyvinyl chloride. Accordingly, blending of polyvinyl chloride with the necessary amount of a prior art elastomeric modifier to give a blend of sufficiently high impact value to meet the impact value specification for Type II (high impact) materials, simultaneously results in a serious deterioration of a number of other important physical properties. In contrast to this behavior of prior art elastomeric modifiers and blends, the blends of the present invention not only conform to the requirement of Type II (high impact) materials with respect to impact value but simultaneously meet the higher requirements specified for Type I (normal impact) materials with respect to tensile strength, hardness and the like. Thus, the tensile strength specification for Type I (normal impact) polyvinyl chloride is 7000 pounds per square inch, minimum. The tensile strengths of the blends of the above table range from 6880 to 7050 pounds per square inch and yet these blends also meet the requirements of Type II (high impact) materials with respect to impact value. (The tensile strength specification for Type II (high impact) materials is only 5000 pounds per square inch, minimum.) Similarly, the Rockwell hardness (R scale) specification for Type I (normal impact) polyvinyl chloride is 110, minimum, a specification met by the blends of this invention in spite of the fact that these blends also meet the requirements of Type II (high impact) materials with respect to impact value. (The hardness specification for Type II (high impact) blends is only 100 Rockwell R scale, minimum.)

It has been found that blends of polyvinyl chloride resins from a wide variety of sources with the pair of blending components of this invention exhibit properties essentially similar to those previously given.

If desired, blends prepared in accordance with this invention may contain additional components, such as pigments, fillers and the like, frequently incorporated into resins and resin blends in accordance with conventional practices of the art.

The general fields of utility of the blends of this invention are self evident. However, as will be obvious from the physical characteristics of these blends, they find their greatest field of usefulness in the fabrication of shaped articles subject to vibration, shock, impact loads, elevated temperatures, and the like during use. Due to the high resistance of these blends to deterioration under the influence of various atmospheric agencies, rigid shaped articles made therefrom are ideally suited for use under conditions where a high environmental stability is required. Structural shapes made from the blends of this invention, which are characterized by a high impact strength, a high heat distortion temperature and high tensile strength, are eminently suited for use in the production of rigid sheets and moldings, pipe, fittings, valves, valve parts, and similar objects.

Be it remembered, that while this invention has been described in connection with specific details and examples thereof, these details and examples are illustrative only and are not to be considered limitations on the spirit and scope of said invention except insofar as these may be incorporated in the appended claims.

We claim:
1. An impact resistant three component blend comprising the following separate components:
   (A) A material selected from the group consisting of vinyl chloride homopolymers and copolymers of at least 80% by weight vinyl chloride and up to 20% by weight of a monovinyl compound copolymerizable therewith____ 45% to 82% by weight based on the total weight of (A), (B) and (C), and (B) A material prepared by the polymerization of a mixture of 30% to 70% by weight styrene and 10% to 30% by weight acrylonitrile in the presence of 20% to 60% by weight of polybutadiene____ 10% to 30% by weight based on the total weight of (A), (B) and (C), and (C) A copolymer of 20% to 30% by weight acrylonitrile and 80% to 70% by weight alpha methyl styrene_____ 8% to 25% by weight based on the total weight of (A), (B) and (C).

2. An impact resistant three component blend comprising the following separate components:
(A) A material selected from the group consisting of vinyl chloride homopolymers and copolymers of at least 80% by weight vinyl chloride and up to 20% by weight of a monovinyl compound copolymerizable therewith____ 45% to 82% by weight based on the total weight of (A), (B) and (C), and (B) A material prepared by the polymerization of a mixture of 30% to 70% by weight styrene and 10% to 30% by weight acrylonitrile in the presence of 20% to 60% by weight of polybutadiene_____ 10% to 30% by weight based on the total weight of (A), (B) and (C), and (C) A copolymer of 20% to 30% by weight acrylonitrile with 80% to 70% by weight of a mixture of alpha methyl styrene and styrene_____ 8% to 25% by weight based on the total weight of (A), (B) and (C).

3. An impact resistant three component blend comprising the following separate components:
(A) A material selected from the group consisting of vinyl chloride homopolymers and copolymers of at least 80% by weight vinyl chloride and up to 20% by weight of a monovinyl compound copolymerizable therewith____ 45% to 82% by weight based on the total weight of (A), (B) and (C), and (B) A material prepared by the polymerization of a mixture of 30% to 70% by weight styrene and 10% to 30% by weight acrylonitrile in the presence of 20% to 60% be weight of polybutadiene_____ 10% to 30% by weight based on the total weight of (A), (B) and (C), and (C) A copolymer of 20% to 30% by weight acrylonitrile with 80% to 70% by weight of a mixture comprising from 50% to 95% by weight alpha methyl styrene and correspondingly from 50% to 5% by weight styrene_____ 8% to 25% by weight based on the total weight of (A), (B) and (C).

4. An impact resistant three component blend comprising the following separate components:
(A) A material selected from the group consisting of vinyl chloride homopolymers and copolymers of at least 80% by weight of a monovinyl compound copolymerizable therewith_____ 60% to 75% by weight based on the total weight of (A), (B) and (C), and (B) A material prepared by the polymerization of a mixture of 45% to 55% by weight syrene and 25% to 30% by weight acrylonitrile in the presence of 20% to 60% by weight of polybutadiene_____ 15% to 20% by weight based on the total weight of (A), (B) and (C), and (C) A copolymers of 20% to 30% by weight acrylonitrile and 80% to 70% by weight alpha methyl styrene_____ 10% to 20% by weight based on the total weight of (A), (B) and (C).

5. An impact resistant three component blend comprising the following separate components:
(A) A material selected from the group consisting of vinyl chloride homopolymers and copolymers of at least 80% by weight vinyl chloride and up to 20% by weight of a monovinyl compound copolymerizable therewith_____ 60% to 75% by weight based on the total weight of (A), (B) and (C), and (B) A material prepared by the polymerization of a mixture of 45% to 55% by weight styrene and 25% to 30% by weight acrylonitrile in the presence of 20% to 60% by weight of polybutadiene_____ 15% to 20% by weight based on the total weight of (A), (B) and (C), and (C) A copolymer of 20% to 30% by weight acrylonitrile with 80% to 70% by weight of a mixture of alpha methyl styrene and styrene_____ 10% to 20% by weight based on the total weight of (A), (B) and (C).

6. An impact resistant three component blend comprising the following separate components:

(A) A material selected from the group consisting of vinyl chloride homopolymers and copolymers of at least 80% by weight vinyl chloride and up to 20% by weight of a monovinyl compound copolymerizable therewith___ 60% to 75% by weight based on the total weight of (A), (B) and (C), and (B) A material prepared by the polymerization of a mixture of 45% to 55% by weight styrene and 25% to 30% by weight acrylonitrile in the presence of 20% to 60% by weight of polybutadiene_____ 15% to 20% by weight based on the total weight of (A), (B) and (C), and (C) A copolymer of 20% to 30% by weight acrylonitrile with 80% to 70% by weight of a mixture comprising about 90% by weight alpha methyl styrene and correspondingly, 10% by weight styrene_____ 10% to 20% by weight based on the total weight of (A), (B) and (C).

7. An impact resistant three component blend comprising the following separate components:

(A) A material selected from the group consisting of vinyl chloride homopolymers and copolymers of at least 80% by weight vinyl chloride and up to 20% by weight of of a monovinyl compound copolymerizable therewith___ 45% to 82% by weight based on the total weight of (A), (B) and (C), and (B) A material prepared by the polymerization of a mixture of 30% to 70% by weight of a material selected from the group consisting of styrene, alpha methyl styrene, vinyl toluenes and alpha methyl vinyl toluenes, together with 10% to 30% by weight of a material selected from the group consisting of acrylonitrile, methacrylonitrile and ethacrylonitrile in the presence of 20% to 60% by weight of a conjugated diolefine polymer_____ 10% to 30% by weight based on the total weight of (A), (B) and (C), and (C) A copolymer of 20% to 30% by weight of the material selected from the group consisting of acrylonitrile, methacrylonitrile and ethacrylonitrile, and 80% to 70% by weight of a material selected from the group consisting of alpha methyl styrene and mixtures of styrene and alpha methyl styrene_____ 8% to 25% by weight based on the total weight of (A), (B) and (C).

8. An impact resistant three component blend comprising the following separate components:

(A) A material selected from the group consisting of vinyl chloride homopolymers and copolymers of at least 80% by weight vinyl chloride and up to 20% by weight of a monovinyl compound copolymerizable therewith _____ 60% to 75% by weight based on the total weight of (A), (B) and (C), and (B) A material prepared by the polymerization of a mixture of 30% to 70% by weight of a material selected from the group consisting of styrene, alpha methyl styrene, vinyl toluenes and alpha methyl vinyl toluenes, together with 10% to 30% by weight of a material selected from the group consisting of acrylonitrile, methacrylonitrile, and ethacrylonitrile in the presence of 20% to 60% by weight of a conjugated diolefine polymer_____ 10% to 30% by weight based on the total weight of (A), (B) and (C), and (C) A copolymer of 20% to 30% by weight of a material selected from the group consisting of acrylonitrile, methacrylonitrile and ethacrylonitrile, and 80% to 70% by weight of material selected from the group consisting of alpha methyl styrene and mixtures of styrene and alpha methyl styrene _____ 10% to 20% by weight based on the total weight of (A), (B) and (C).

References Cited in the file of this patent

UNITED STATES PATENTS 2,802,808   Hayes _____ Aug. 13, 1957
2,802,809   Hayes _____ Aug. 13, 1957

OTHER REFERENCES

Hart: Industrie Chimique Belge, 21, 1053–1063, especially page 1057 (1956).